(12) United States Patent
Zhang

(10) Patent No.: US 11,848,841 B2
(45) Date of Patent: Dec. 19, 2023

(54) METRICS COLLECTING METHOD AND APPARATUS FOR MEDIA STREAMING SERVICE, MEDIUM, AND ELECTRONIC DEVICE

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/702,732

(22) Filed: Mar. 23, 2022

(65) Prior Publication Data

US 2022/0217063 A1    Jul. 7, 2022

Related U.S. Application Data

(63) Continuation of application No. PCT/CN2021/088039, filed on Apr. 19, 2021.

(30) Foreign Application Priority Data

May 19, 2020   (CN) .......................... 202010425876.6

(51) Int. Cl.
  *G06F 13/00*   (2006.01)
  *H04L 43/067*   (2022.01)
  (Continued)

(52) U.S. Cl.
  CPC ............ *H04L 43/067* (2013.01); *H04L 65/61* (2022.05); *H04L 65/80* (2013.01)

(58) Field of Classification Search
  CPC ....... H04L 43/067; H04L 65/61; H04L 65/80; H04L 65/612; H04L 41/147;
  (Continued)

(56) References Cited

U.S. PATENT DOCUMENTS 10,693,933 B2 *   6/2020   Tucker ................... H04L 51/06
10,812,543 B1 *   10/2020   Chakravorty ....... H04L 65/1069
(Continued)

FOREIGN PATENT DOCUMENTS

CN     1791263 A      6/2006
CN   101588258 A     11/2009
(Continued)

OTHER PUBLICATIONS

The World Intellectual Property Organization (WIPO) International Search Report for PCT/CN2021/088039 dated Jul. 15, 2021 6 Pages (including translation).
(Continued)

*Primary Examiner* — Kenneth R Coulter
(74) *Attorney, Agent, or Firm* — ANOVA LAW GROUP PLLC

(57) ABSTRACT

A metrics collecting method includes: obtaining metrics configuration information, the metrics configuration information including information of a metrics reporting time segment; generating metrics reporting configuration information of a media streaming service; and transmitting the metrics reporting configuration information to a user equipment to cause the user equipment to perform metrics reporting of the media streaming service. The technical solutions provided by the embodiments of the present disclosure may control the metrics reporting of the user equipment with enhanced flexibity.

18 Claims, 6 Drawing Sheets

(51) Int. Cl.
*H04L 65/61* (2022.01)
*H04L 65/80* (2022.01)

(58) Field of Classification Search
CPC . H04L 43/028; H04L 43/065; H04L 41/0806; H04L 43/08; H04L 21/647; H04L 21/2393; H04L 21/25808; H04L 21/25866
USPC .............................. 709/220–222, 224, 223
See application file for complete search history.

(56) References Cited

U.S. PATENT DOCUMENTS

| | | | |
|---|---|---|---|
| 11,025,695 B2* | 6/2021 | Tucker | H04L 65/61 |
| 2010/0029266 A1* | 2/2010 | van Gassel | H04L 65/752 |
| | | | 455/424 |
| 2016/0119395 A1 | 4/2016 | Li et al. | |
| 2017/0126768 A1* | 5/2017 | Tucker | H04L 65/613 |
| 2017/0364647 A1* | 12/2017 | Sevenster | G06F 40/186 |
| 2020/0366967 A1 | 11/2020 | Liu et al. | |
| 2021/0037072 A1* | 2/2021 | Chakravorty | H04L 65/61 |
| 2022/0231932 A1* | 7/2022 | Zhang | H04L 65/60 |

FOREIGN PATENT DOCUMENTS

| | | |
|---|---|---|
| CN | 102111278 A | 6/2011 |
| CN | 103200579 A | 7/2013 |
| CN | 107493508 A | 12/2017 |
| CN | 108810522 A | 11/2018 |
| CN | 108965918 A | 12/2018 |
| CN | 110166837 A | 8/2019 |
| CN | 110247816 A | 9/2019 |
| CN | 111711867 A | 9/2020 |
| WO | 2012088922 A1 | 7/2012 |
| WO | 2015000141 A1 | 1/2015 |

OTHER PUBLICATIONS

3rd Generation Partnership Project, "Technical Specification Group Services and System Aspects, 5G Media Streaming (5GMS); Protocols (Release 16)," 3GPP TS 26.512 V1.0.0, Mar. 31, 2020 (Mar. 31, 2020), sections 4.6.2-4.8.2. 27 pages.

China National Intellectual Property Administration (CNIPA) Office Action 1 for 202010425876.6 dated Jan. 11, 2023 12 Pages (including translation).

* cited by examiner

METRICS COLLECTING METHOD AND APPARATUS FOR MEDIA STREAMING SERVICE, MEDIUM, AND ELECTRONIC DEVICE

RELATED APPLICATION(S)

This application is a continuation application of PCT Patent Application No. PCT/CN2021/088039 filed on Apr. 19, 2021, which claims priority to Chinese Patent Application No. 2020104258766 entitled "METRICS COLLECTING METHOD AND APPARATUS FOR MEDIA STREAMING SERVICE, MEDIUM, AND ELECTRONIC DEVICE" filed with the China National Intellectual Property Administration on May 19, 2020, all of which are incorporated by reference in entirety.

FIELD OF THE TECHNOLOGY

The present disclosure relates to the field of computer and communications technologies, and specifically, to metrics collecting technologies for a media streaming service.

BACKGROUND

For a media streaming service, metrics collecting solutions based on a control plane proposed may be as follows: an access network transmits metrics reporting configuration information to user equipment (UE) to instruct the UE to perform metrics reporting of the media streaming service. However, such metrics reporting process for the media streaming service is met with limited use.

SUMMARY

Embodiments of the present disclosure provide a metrics collecting method and an apparatus for a media streaming service, a medium, and an electronic device, which can flexibly control metrics reporting time of user equipment, thereby improving a control ability of a control plane for the metrics reporting.

Other features and advantages of the present disclosure will become apparent from the following detailed description or will be acquired in part through the practice of the present disclosure.

In one aspect, the present disclosure provides a metrics collecting method, performed by an access network device. The method includes: obtaining metrics configuration information, the metrics configuration information including information of a metrics reporting time segment; generating metrics reporting configuration information of a media streaming service; and transmitting the metrics reporting configuration information to user equipment to activate the user equipment to perform metrics reporting of the media streaming service.

In another aspect, the present disclosure provides a metrics collecting method for a media streaming service, performed by user equipment, which includes: receiving metrics reporting configuration information transmitted by an access network device, the metrics reporting configuration information being transmitted by the access network device before a metrics reporting time segment starts and being used to activate the user equipment to perform metrics reporting of the media streaming service; generating, based on the metrics reporting configuration information, a metrics reporting configuration response message, the metrics reporting configuration response message being used to indicate whether to accept the metrics reporting configuration information; and feeding back the metrics reporting configuration response message to the access network device.

In yet another aspect, the present disclosure provides a metrics collecting apparatus, the apparatus including: a memory storing computer program instructions; and a processor coupled to the memory and configured to execute the computer program instructions and perform obtaining metrics configuration information, the metrics configuration information including information of a metrics reporting time segment; generating metrics reporting configuration information of the media streaming service; and transmitting the metrics reporting configuration information to a user equipment to cause the user equipment to perform metrics reporting of the media streaming service.

In yet another aspect, the present disclosure provides a non-transitory computer-readable storage medium storing computer program instructions executable by at least one processor to perform: obtaining metrics configuration information, the metrics configuration information including information of a metrics reporting time segment; generating metrics reporting configuration information of the media streaming service; and transmitting the metrics reporting configuration information to a user equipment to cause the user equipment to perform metrics reporting of the media streaming service.

In the technical solutions provided by some embodiments of the present disclosure, information of a metrics reporting time segment is obtained, then before the metrics reporting time segment starts, metrics reporting configuration information is transmitted to user equipment. This enables the user equipment to be flexibly controlled to perform metrics reporting.

The above general descriptions and the following detailed descriptions are merely for exemplary and explanatory purposes, and cannot limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of the particular details, or another method, unit, apparatus, or step may be used. In other embodiments, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, may not include all content and operations/steps, and may not be performed in the described orders either. For example, some operations/steps may be further divided, while some operations/steps may be combined or partially combined. Therefore, an actual execution order may change.

Figure 1:
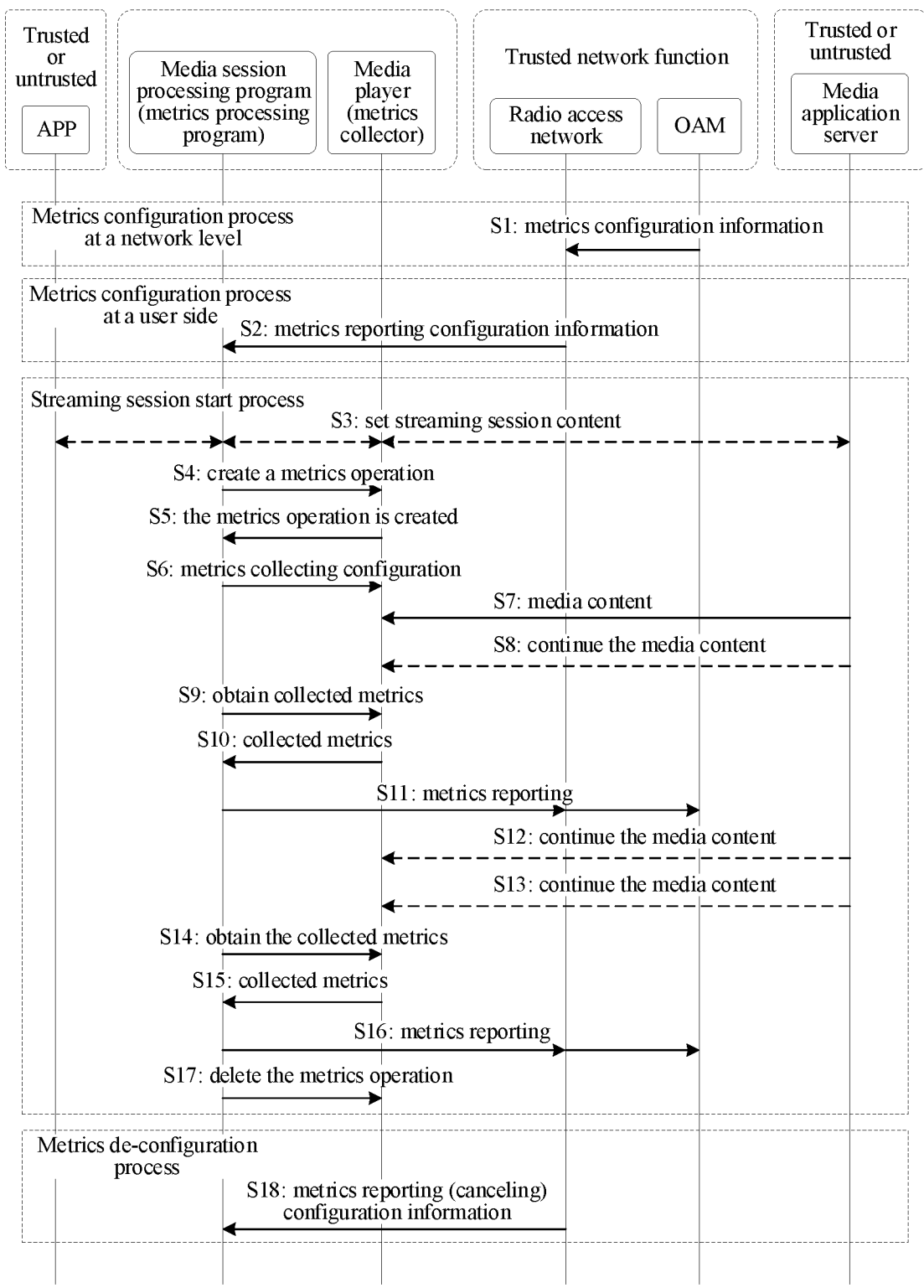
FIG. 1 is a schematic diagram of a metrics collecting process based on a control plane according to embodiment(s) of the present disclosure.

As shown in FIG. 1, a metrics collecting solution based on a control plane includes the following processes: a metrics configuration process at a network level, a metrics configuration process at a user side, a streaming session start process, and a metrics de-configuration process.

In the metrics configuration process at a network level, overall metrics configuration is performed at the network level, which includes: Step S1, metrics configuration information is transmitted from an operation administration and maintenance (OAM) system to a radio access network (RAN), and the RAN does not forward the information to user equipment (UE) at this stage. The metrics configuration information may include, for example: a geographic area where metrics collecting is to be activated (that is, a valid position for metrics reporting), and the like.

The metrics configuration process at a user side includes: Step S2, after the RAN side detects that the UE enters the valid position for the metrics reporting (the geographic area where the metrics collecting and reporting are to be performed, such as a cell, a location area, and the like), metrics reporting configuration information is transmitted from the RAN to a metrics processing program function in a media session processing program through a 5G control plane to activate the UE for the metrics reporting.

The streaming session start process includes: Step S3, set a streaming session content. In this process, session establishment is performed together with a signaling transaction.

Step S4, the media session processing program instructs a media player to create a new metrics collecting operation.

Step S5, the media player returns a response to the creation of the metrics collecting operation.

Step S6, the media session processing program transmits configuration information of the metrics collecting operation to the media player (that is, which metrics are to be measured).

Step S7, a media application server transmits media content to the media player.

Step S8, the media application server continues to transmit more media content to the media player.

Step S9, a metrics processing program requests collected metrics information from the media player.

Step S10, the media player returns the collected metrics information to the metrics processing program.

Step S11, the media session processing program reports the metrics through the 5G control plane.

Step S12, the session continues, and the media application server continues to transmit the media content to the media player.

Step S13, the media application server continues to transmit the media content to the media player.

Step S14, the metrics processing program requests collected final metrics.

Step S15, the media player returns the final collected metrics.

Step S16, the metrics are reported to the OAM through the 5G control plane.

Step S17, the media session processing program instructs the media player to delete the metrics collecting operation.

The metrics de-configuration process includes: step S18, after the UE leaves the valid position for metrics reporting, the RAN transmits metrics reporting canceling configuration information to the UE to stop the metrics collecting.

According to the process shown in FIG. 1, in the existing standards, metrics reporting requests for a specific time segment cannot be flexibly implemented, and the application program or the UE does not have a permission capability for the metrics collecting requested by a network. This obviously increases potential security risks of user data for an operator network to directly collect application metrics data of the UE.

Figure 2:
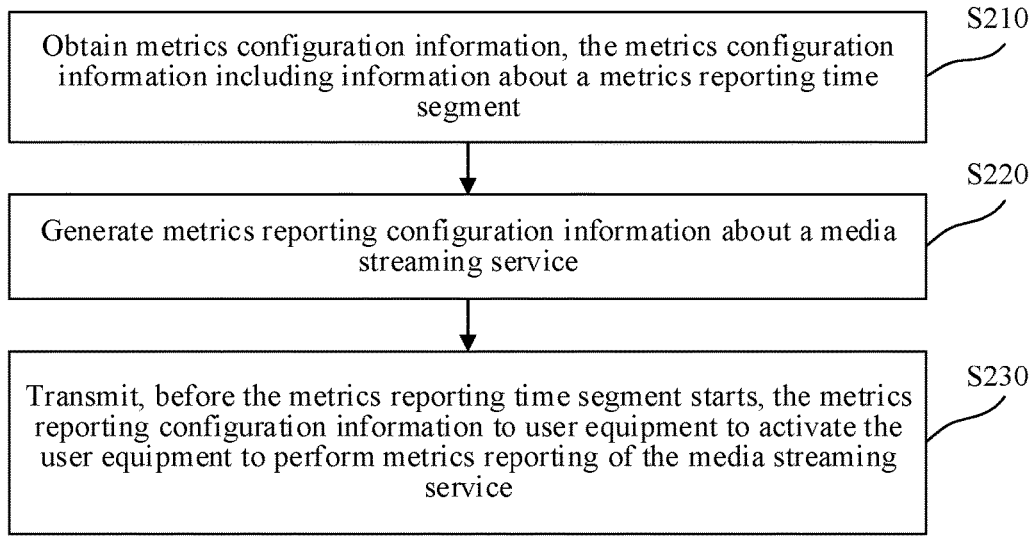
FIG. 2 is a schematic flowchart of a metrics collecting method for a media streaming service according to embodiment(s) of the present disclosure.

The technical solution of the embodiments of the present disclosure is described in detail in the following:

FIG. 2 is a flowchart of a metrics collecting method for a media streaming service according to an embodiment of the present disclosure. The metrics collecting method for a media streaming service can be performed by an access network device, for example, it can be performed by a base station. Referring to FIG. 2, the metrics collecting method for a media streaming service includes at least steps S210 to S230, which are described in detail in the following:

In step S210, obtain metrics configuration information, the metrics configuration information including information of a metrics reporting time segment.

Figure 3:
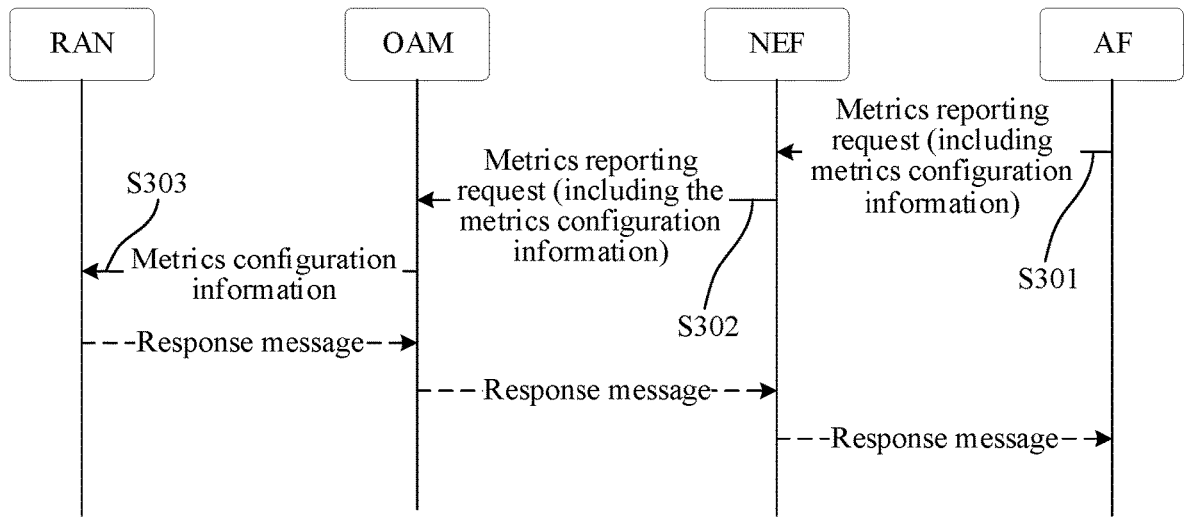
FIG. 3 is a schematic flowchart of an access network device obtaining a metrics reporting time segment according to embodiment(s) of the present disclosure.

In an embodiment of the present disclosure, an access network device can receive the metrics configuration information transmitted by an OAM. Specifically, as shown in FIG. 3, in step S301, an application function (AF) transmits a metrics reporting request to a network exposure function (NEF), where the metrics reporting request includes the metrics configuration information and the metrics configuration information includes information of a metrics reporting time segment; in step S302, the NEF transmits the metrics reporting request to the OAM, and the metrics reporting request also includes the metrics configuration information; in step S303, the OAM transmits the metrics configuration information to a RAN device, and then the RAN device can obtain the information of the metrics reporting time segment from the metrics configuration information. In certain embodiment(s), after the metrics configuration information is transmitted to the RAN device, the RAN device can feed back a response message to the OAM, the OAM can feed back the response message to the NEF, and the NEF can also feed back a response message to the AF.

Figure 4:
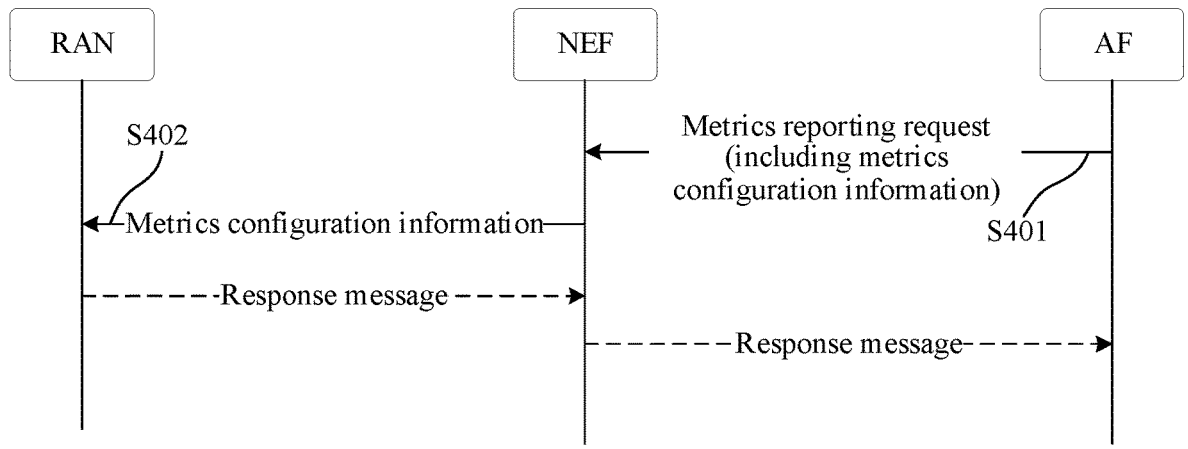
FIG. 4 is a schematic flowchart of an access network device obtaining a metrics reporting time segment according to embodiment(s) of the present disclosure.

In an embodiment of the present disclosure, the access network device can receive the metrics configuration information transmitted by the NEF. Specifically, as shown in FIG. 4, in step S401, the AF transmits the metrics reporting request to the NEF, where the metrics reporting request includes the metrics configuration information, and the metrics configuration information includes information of the metrics reporting time segment; in step S402, the NEF transmits the metrics configuration information to the RAN device, and then the RAN device can obtain the information of the metrics reporting time segment from the metrics configuration information. In certain embodiment(s), after the metrics configuration information is transmitted to the RAN device, the RAN device can feed back a response message to the NEF, or the NEF can also feed back a response message to the AF.

The NEF is between a 5G core network and an external third-party application function (there may also be some internal AFs), and some or all external applications responsible for managing external open network data and information usually pass through the NEF to access internal data of the 5G core network. The NEF provides corresponding security assurance to ensure security of the external applications to the network, and provides quality of service (QoS) customization capability exposure of external applications, mobility state event subscription, AF influence routing and other functions. The AF refers to various services at an application layer, which may be internal applications of operators such as a VoIte AF (which may be similar to VoIte As of 4G) or an AF of third-party applications (such as AF functions of a video server or a game server).

In an embodiment of the present disclosure, the metrics configuration information can be pre-configured in the access network device, and then the access network device can obtain the information of the metrics reporting time segment from the pre-configured metrics configuration information.

In certain embodiment(s), the term "per-configured" refers to that the metrics configuration information is configured in advance or ahead of time, for example ahead of when step S220 is performed.

In step S220, generate metrics reporting configuration information of the media streaming service.

In an embodiment of the present disclosure, the metrics reporting configuration information may include a reporting interval, a sample percentage, a streaming source filter, and metrics information to be reported. The reporting interval is used to indicate a time interval for metrics information reporting, and if the reporting interval is not specified, a single final metrics report is to be transmitted after the streaming session ends; the sample percentage is used to indicate a percentage of streaming sessions for which metrics are to be reported, and if the sample percentage is not specified, reports of some or all streaming sessions are to be transmitted; the streaming source filter is used to indicate a list of URL patterns for which metrics are to be reported, if the streaming source filter is not specified, some or all sessions are to be reported; and the metrics information to be reported may include data transmission delay, streaming viewing experience data, first buffer time, freeze time, predictive information of media streaming playback, and the like, and the metrics information is not limited in the present disclosure.

The streaming viewing experience data may be, for example, objective experience data and subjective experience data of video viewing; the first buffer time may be, for example, the total time length from the time a playback instruction for a video is received to the time when the first frame can be played; the freeze time may be the total lag time of watching a video (that is, the time spent by a user on waiting for buffer); and the predictive information of media streaming playback may be information predicted according to historical information of the user, for example, a predicted time length of video playback and the like. The predictive information of media streaming playback may be information obtained by an application program through prediction based on analysis of historical information of the media streaming playback on the application program, or information obtained by an analysis and prediction function module on a UE through prediction based on analysis of historical information of some or all the media streaming playback on the UE.

In step S230, transmit, before the metrics reporting time segment starts, the metrics reporting configuration information to the user equipment to activate the user equipment to perform metrics reporting of the media streaming service.

In an embodiment of the present disclosure, the user equipment may be an access network device, such as a base station, that covers one or more user equipment in the area.

As for the details of transmitting metrics reporting configuration information, the present disclosure proposes the following embodiments:

Embodiment 1

In an embodiment of the present disclosure, the access network device may not add time information to the metrics reporting configuration information when transmitting the metrics reporting configuration information to the user equipment. In this scenario, the access network device may consider when to transmit the metrics reporting configuration information so that the user equipment can start metrics reporting processing at the start time point of the reporting time segment. After receiving the metrics reporting configuration information including the start time point of the metrics reporting time segment, the user equipment can start the metrics reporting processing of the media streaming service.

In addition, if the access network device determines that the metrics reporting time segment ends according to the information of the metrics reporting time segment, the access network device transmits information of stopping the metrics reporting to the user equipment, and the user equipment ends the metrics reporting processing of the media streaming service immediately after receiving the information of stopping the metrics reporting.

Embodiment 2

In an embodiment of the present disclosure, the access network device may not add time information to the metrics reporting configuration information when transmitting the metrics reporting configuration information to the user equipment. In this scenario, the access network device may consider when to transmit the metrics reporting configuration information so that the user equipment can start metrics reporting processing at the start time point of the reporting time segment. After receiving the metrics reporting configuration information including the start time point of the metrics reporting time segment, the user equipment can start the metrics reporting processing of the media streaming service.

At the same time, if the access network device determines the end of the metrics reporting time segment according to the information of the metrics reporting time segment, the information of stopping the metrics reporting transmitted to the user equipment can include the end time point of the metrics reporting time segment, and the user equipment can end the metrics reporting processing of the media streaming service at the end time point after receiving the information of stopping the metrics reporting.

Embodiment 3

In an embodiment of the present disclosure, the metrics reporting configuration information transmitted by the access network device to the user equipment can include the start time point of the metrics reporting time segment, where the user equipment can start the metrics reporting processing of the media streaming service at the start time point after receiving the metrics reporting configuration information.

In addition, if the access network device determines that the metrics reporting time segment ends according to the information of the metrics reporting time segment, the access network device transmits information of stopping the metrics reporting to the user equipment, and the user equipment ends the metrics reporting processing of the media streaming service immediately after receiving the information of stopping the metrics reporting.

Embodiment 4

In an embodiment of the present disclosure, the metrics reporting configuration information transmitted by the access network device to the user equipment can include the start time point of the metrics reporting time segment. In this scenario, the user equipment can start the metrics reporting processing of the media streaming service at the start time point after receiving the metrics reporting configuration information.

At the same time, if the access network device determines the end of the metrics reporting time segment according to the information of the metrics reporting time segment, the information of stopping the metrics reporting transmitted to the user equipment may include the end time point of the metrics reporting time segment, and the user equipment can end the metrics reporting processing of the media streaming service at the end time point after receiving the information of stopping the metrics reporting.

Embodiment 5

In an embodiment of the present disclosure, the metrics reporting configuration information transmitted by the access network device to the user equipment may include the metrics reporting time segment. In this scenario, after receiving the metrics reporting configuration information, the user equipment can start the metrics reporting processing of the media streaming service at the start time point of the metrics reporting time segment and end the metrics reporting processing of the media streaming service at the end time point of the metrics reporting time segment.

In addition, the connection management states of UE in a network include an idle state, a connected state, and an inactive state. If the user equipment is in the connected state, the metrics reporting configuration information can be directly transmitted to the user equipment. If the user equipment is in the idle state or inactive state, a paging message can be transmitted to the user equipment first, and then the metrics reporting configuration information is transmitted to the user equipment after the UE initiates a service request in response to the paging message and changes to the connected state. Alternatively, if the user equipment is in the idle state or inactive state, the metrics reporting configuration information is transmitted to the user equipment after an access network detects that the state of the user equipment changes to the connected state.

In an embodiment of the present disclosure, after receiving the metrics reporting configuration information, the user equipment may also feed back a metrics reporting rejection message. After receiving the metrics reporting rejection message, the access network device can stop collecting the media streaming service metrics of the user equipment.

Figure 5:
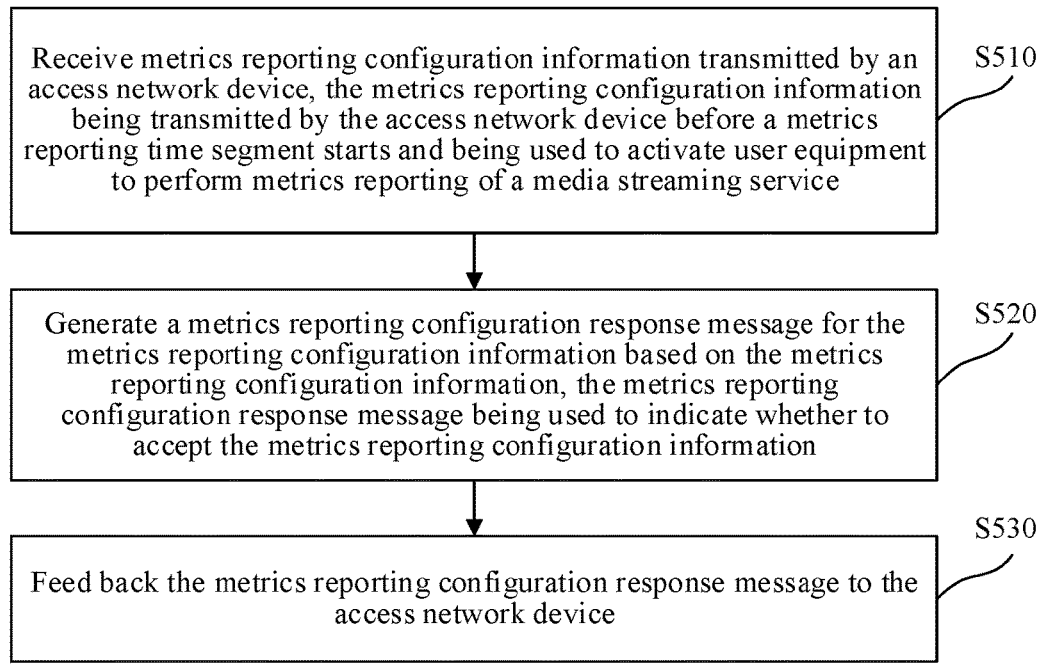
FIG. 5 is a schematic flowchart of a metrics collecting method for a media streaming service according to embodiment(s) of the present disclosure.

The above embodiments describe the technical solutions of the embodiments of the present disclosure from the perspective of the access network device, and the following explains the implementation details of the technical solutions of the embodiments of the present disclosure from the perspective of the user equipment:

FIG. 5 is a flowchart of a metrics collecting method for a media streaming service according to an embodiment of the present disclosure, where the metrics collecting method for a media streaming service can be performed by a user equipment. Referring to FIG. 5, the metrics collecting method for a media streaming service includes at least steps S510 to S530, which are described in detail in the following:

In step S510, receive metrics reporting configuration information transmitted by an access network device, the metrics reporting configuration information being transmitted by the access network device before a metrics reporting time segment starts and being used to activate the user equipment to perform metrics reporting of the media streaming service.

In step S520, generate a metrics reporting configuration response message for the metrics reporting configuration information based on the metrics reporting configuration information, the metrics reporting configuration response message being used to indicate whether to accept the metrics reporting configuration information.

In an embodiment of the present disclosure, whether to accept the metrics reporting configuration information may be determined according to at least one of the following factors: permission information of an application program processing the media streaming service and permission information of the user equipment.

For example, if the application program processing the media streaming service does not allow metrics reporting to a network, for example, in scenarios that there is no relevant metrics reporting agreement between a provider of the application program and a network operator, or the application program does not allow metrics data to be reported to an access network by means of control plane metrics reporting, it can be determined that the metrics reporting configuration information is not accepted.

For another example, if a user of the user equipment does not allow metrics reporting to a network, for example, for the purpose of privacy protection, it can be determined that the metrics reporting configuration information is not accepted.

In an embodiment of the present disclosure, if it is determined that the metrics reporting configuration information is not accepted based on the metrics reporting configuration information, the generated metrics reporting configuration response message may be a metrics reporting rejection message. In this scenario, after receiving the metrics reporting rejection message, the access network device can stop collecting metrics information of the media streaming service of the terminal device.

In an embodiment of the present disclosure, if it is determined that the metrics reporting configuration information is accepted based on the metrics reporting configuration information, the generated metrics reporting configuration response message may be a metrics reporting acceptance message. In this scenario, the user equipment can collect and report the metrics data based on the metrics reporting configuration information. The specific metrics to be reported can be determined according to the metrics reporting configuration information, and details thereof are as described in the technical solutions of the embodiments.

In step S530, feed back the metrics reporting configuration response message to the access network device.

The technical solution of the embodiment shown in FIG. 5 enables the user equipment to implement permission for metrics reporting, thereby preventing the network from collecting the metrics data of applications on the UE application without authorization or permission, which helps improve the security of the metrics data and avoid illegal network attacks and leakage of user privacy.

The technical solutions of the embodiments of the present disclosure add a function that the application program or the user equipment rejects or agrees to a metrics collecting request of the network, and adds a parameter of effective time of the metrics collecting in the metrics collecting method.

Figure 6:
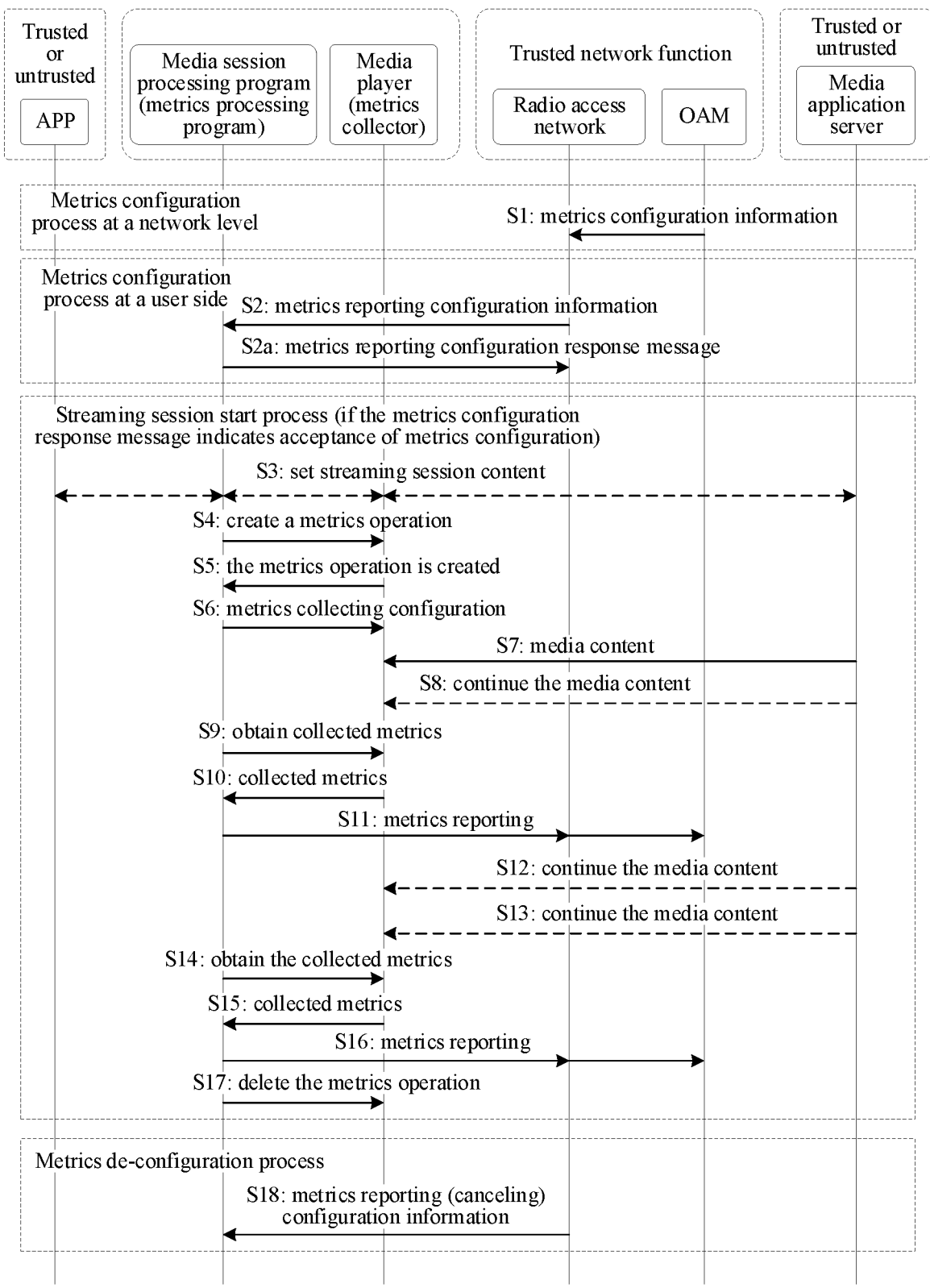
FIG. 6 is a schematic diagram of a metrics collecting process according to embodiment(s) of the present disclosure.

Specifically, some steps in the metrics collecting process based on the control plane shown in FIG. 1 are enhanced in the embodiments of the present disclosure. Specifically, as shown in FIG. 6, for step S2, the base station activates the UE within the coverage area of the base station for metrics reporting at a time point prior to the start of the metrics reporting time segment, and the metrics reporting time segment can be included in the metrics configuration information and transmitted to the base station by the OAM in step S1. Definitely, the metrics configuration information including the metrics reporting time segment can also be pre-configured in the base station, or can be directly transmitted to the base station by the NEF (see the embodiment for details).

At the same time, step S2a is added after step S2, that is, after receiving the metrics reporting configuration information transmitted by the radio access network, a media session processing program (metrics processing program) can determine whether to receive the metrics reporting configuration information according to its own configuration or policy, and feed back the metrics reporting configuration response message to the radio access network to indicate whether to accept the metrics reporting configuration information. If the metrics reporting configuration response message indicates acceptance of the metrics reporting configuration information, the subsequent steps are performed. If the metrics reporting configuration response message indicates rejection of the metrics reporting configuration information, the metrics reporting processing for the UE ends.

In addition, in the metrics de-configuration process, after determining that the metrics reporting time segment is to end according to the information of the metrics reporting time segment, the base station transmits configuration information of canceling the metrics reporting to the media session processing program (metrics processing program).

In the metrics collecting process based on the control plane, the information of metrics reporting time segment and a valid position for metrics reporting can be used at the same time, or only the information of metrics reporting time segment or only the valid position for the metrics reporting is used.

If both the information of the metrics reporting time segment and the valid position for the metrics reporting are used, the RAN triggers the UE to perform the metrics reporting processing only in the metrics reporting time segment and when the UE is in the valid position for the metrics reporting; and after the end time point of the metrics reporting time segment or when the UE is no longer at the valid position for the metrics reporting, the RAN controls the UE to stop the metrics reporting processing.

If merely the information of the metrics reporting time segment is used, the RAN triggers the UE to perform the metrics reporting processing at the start time point of the metrics reporting time segment; and after the end time point of the metrics reporting time segment, the RAN controls the UE to stop the metrics reporting processing.

If merely the valid position for the metrics reporting is used, the RAN triggers the UE to perform the metrics reporting processing when the UE is at the valid position for metrics reporting; and when the UE is no longer at the valid position for metrics reporting, the RAN controls the UE to stop the metrics reporting processing.

The technical solution of the embodiment of the present disclosure can flexibly control metrics reporting time of the user equipment, thereby improving a control ability of the control plane for the metrics reporting. Moreover, the user equipment can implement permission for metrics reporting, thereby preventing the network from collecting the metrics data of applications on the UE directly, which helps improve the security of the metrics data and avoid illegal network attacks and leakage of user privacy.

The following describes device embodiments of the present disclosure, which can be used to perform the metrics collecting method for a media streaming service in the embodiments of the present disclosure. For details not disclosed in the device embodiments of the present disclosure, reference may be made to the embodiments of the metrics collecting method for a media streaming service described above in the present disclosure.

Figure 7:
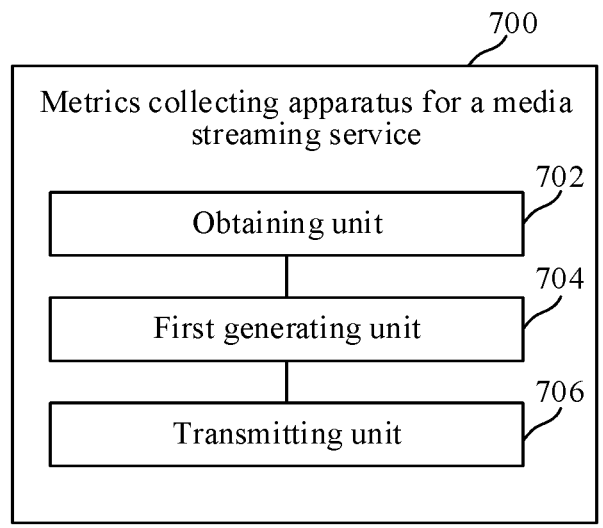
FIG. 7 is a schematic block diagram of a metrics collecting apparatus for a media streaming service according to embodiment(s) of the present disclosure.

FIG. 7 is a block diagram of a metrics collecting apparatus for a media streaming service according to an embodiment of the present disclosure. The metrics collecting apparatus may be provided in an access network device, for example, in a base station.

Referring to FIG. 7, a metrics collecting apparatus 700 for a media streaming service according to an embodiment of the present disclosure includes: an obtaining unit 702, a first generating unit 704 and a transmitting unit 706.

The obtaining unit 702 is configured to obtain metrics configuration information, the metrics configuration information including information of a metrics reporting time segment.

The first generating unit 704 is configured to generate metrics reporting configuration information of the media streaming service.

The transmitting unit 706 is configured to transmit, before the metrics reporting time segment starts, the metrics reporting configuration information to user equipment to activate the user equipment to perform metrics reporting of the media streaming service.

In some embodiments of the present disclosure, based on the solutions, the obtaining unit 702 is configured to obtain metrics configuration information in any of the following manners: receiving the metrics configuration information transmitted by an operation administration and maintenance function entity; receiving the metrics configuration information transmitted by a network exposure function entity; or obtaining the pre-configured metrics configuration information.

In some embodiments of the present disclosure, based on the solutions, the metrics reporting configuration information includes a start time point of the metrics reporting time segment, the start time point being used to instruct the user equipment to perform the metrics reporting of the media streaming service at the start time point.

In some embodiments of the present disclosure, based on the solutions, the transmitting unit 706 is further configured to: if an end time point of the metrics reporting is determined according to the information of the metrics reporting time segment, transmit instruction information of stopping the metrics reporting to the user equipment.

In some embodiments of the present disclosure, based on the solutions, the information of stopping the metrics reporting includes the end time point of the metrics reporting time segment, the end time point being used to instruct the user equipment to stop the metrics reporting of the media streaming service at the end time point.

In some embodiments of the present disclosure, based on the solutions, the metrics reporting configuration information includes the information of the metrics reporting time segment, the information of metrics reporting time segment being used to instruct the user equipment to perform the metrics reporting of the media streaming service at the start time point of the metrics reporting time segment and stop the metrics reporting of the media streaming service at the end time point of the metrics reporting time segment.

In some embodiments of the present disclosure, based on the solutions, the transmitting unit 706 is configured to: transmit the metrics reporting configuration information to a first type of user equipment in a connected state.

In some embodiments of the present disclosure, based on the solutions, the transmitting unit 706 is configured to transmit the metrics reporting configuration information in any of the following manners: transmitting a paging message to a second type of user equipment in an inactive state, and transmitting the metrics reporting configuration information to the second type of user equipment after receiving a service request from the second type of user equipment, where the second type of user equipment transmits the service request and switches to a connected state in response to the paging message; or detecting whether the state of a second type of user equipment in an idle state or an inactive state changes to a connected state, and if it is detected that the state of the second type of user equipment changes to the connected state, transmitting the metrics reporting configuration information to the second type of user equipment.

In some embodiments of the present disclosure, based on the solutions, the metrics collecting apparatus 700 further includes: a first processing unit, configured to receive a metrics reporting configuration response message fed back by the user equipment; if the metrics reporting configuration response message indicates rejection of the metrics reporting configuration information, stop collecting metrics information of the media streaming service in the user equipment; and if the metrics reporting configuration response message indicates acceptance of the metrics reporting configuration information, continue receiving the metrics information of the media streaming service in the user equipment.

Figure 8:
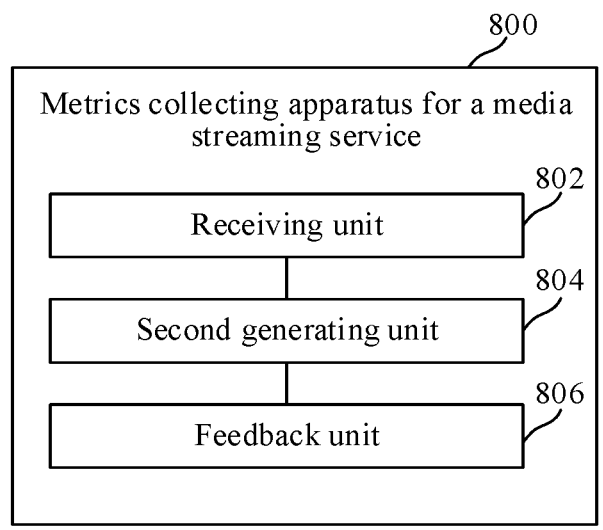
FIG. 8 is a schematic block diagram of a metrics collecting apparatus for a media streaming service according to embodiment(s) of the present disclosure.

FIG. 8 is a block diagram of a metrics collecting apparatus for a media streaming service according to an embodiment of the present disclosure, the metrics collecting apparatus may be provided in a user equipment.

Referring to FIG. 8, a metrics collecting apparatus 800 for a media streaming service according to an embodiment of the present disclosure includes: a receiving unit 802, a second generating unit 804, and a feedback unit 806.

The receiving unit 802 is configured to receive metrics reporting configuration information transmitted by an access network device, the metrics reporting configuration information being transmitted by the access network device before a metrics reporting time segment starts and being used to activate user equipment to perform metrics reporting of the media streaming service.

The second generating unit 804 is configured to generate, based on the metrics reporting configuration information, a metrics reporting configuration response message for the metrics reporting configuration information, the metrics reporting configuration response message being used to indicate whether to accept the metrics reporting configuration information.

The feedback unit 806 is configured to feed the metrics reporting configuration response message for the metrics reporting configuration information back to the access network device.

In some embodiments of the present disclosure, based on the solutions, the metrics collecting apparatus 800 further includes: a second processing unit, configured to determine whether to accept the metrics reporting configuration information according to at least one of the following factors: permission information of an application program processing the media streaming service and permission information of the user equipment.

In some embodiments of the present disclosure, based on the solutions, the metrics reporting configuration information includes the metrics information to be reported, the metrics information to be reported including: predictive information of media streaming playback, the predictive information of media streaming playback being predicted by a media streaming application or the user equipment.

Figure 9:
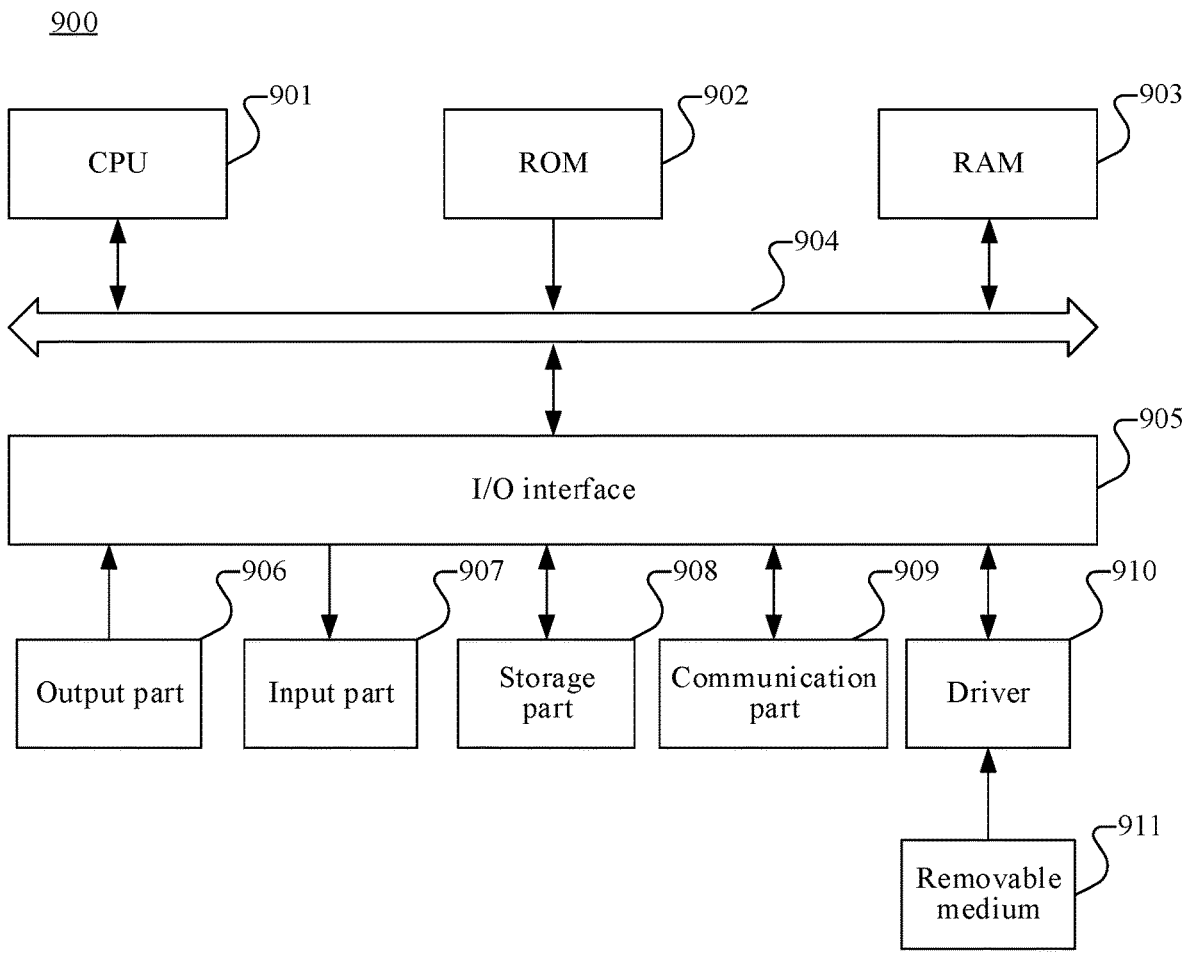
FIG. 9 is a schematic structural diagram of a computer system suitable for implementing an electronic device according to embodiment(s) of the present disclosure.

FIG. 9 is a schematic structural diagram of a computer system suitable for implementing an electronic device according to an embodiment of the present disclosure.

A computer system 900 of an electronic device shown in FIG. 9 is only an example, which is not to impose any limitation on the function and scope of use of the embodiments of the present disclosure.

As shown in FIG. 9, the computer system 900 includes a central processing unit (CPU) 901 that can perform various appropriate actions and processes, for example, perform the methods described in the embodiments, according to a program stored in a read-only memory (ROM) 902 or a program loaded into a random access memory (RAM) 903 from a storage part 908. The RAM 903 further stores various programs and data desirable for operating the system. The CPU 901, ROM 902 and RAM 903 are connected to each other through a bus 904. An input/output (I/O) interface 905 is also connected to the bus 904.

The following components are connected to the I/O interface 905: an input part 906 including a keyboard, a mouse, or the like, an output part 907 including a cathode ray tube (CRT), a liquid crystal display (LCD), a speaker, or the like, a storage part 908 including a hard disk, or the like, and a communication part 909 including a network interface card such as a local area network (LAN) card or a modem. The communication part 909 performs communication processing by using a network such as the Internet. A driver 910 is also connected to the I/O interface 905 as desired. A removable medium 911, such as a magnetic disk, an optical disc, a magneto-optical disk, or a semiconductor memory, is installed on the drive 910 as desired, so that a computer program read from the removable medium is installed into the storage part 908 as desired.

Particularly, according to the embodiments of the present disclosure, the processes described above by referring to the flowcharts may be implemented as computer software programs. For example, this embodiment of the present disclosure includes a computer program product, the computer program product includes a computer program carried on a computer-readable medium, and the computer program includes a program used for performing the methods shown in the flowcharts. In such an embodiment, by using the communication part 909, the computer program may be downloaded and installed from a network, and/or installed from the removable medium 911. When the computer program is executed by the CPU 901, the various functions defined in the system of the present disclosure are executed.

The computer-readable medium shown in the embodiments of the present disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable program. A data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may transmit, propagate, or transmit a program that is used by or used in conjunction with an instruction execution system, an apparatus, or a device. The computer program included in the computer-readable medium may be transmitted by using any suitable medium, including but not limited to: a wireless medium, a wired medium, or the like, or any suitable combination thereof.

The flowcharts and block diagrams in the accompanying drawings illustrate system architectures, functions and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described can also be set in a processor. Names of the units do not constitute a limitation on the units in a specific embodiment.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to another aspect, the present disclosure further provides a computer-readable medium. The computer-readable medium may be included in the electronic device described in the embodiments, or may exist alone and is not disposed in the electronic device. The computer-readable medium carries one or more programs, the one or more programs, when executed by the electronic device, causing the electronic device to implement the method described in the embodiments.

Although a plurality of modules or units of a device configured to perform actions are discussed in the detailed description, such division is not mandatory. Actually, according to the implementations of the present disclosure, the features and functions of two or more modules or units described above may be implemented in one module or unit. On the contrary, the features and functions of one module or unit described above may be further divided to be embodied by a plurality of modules or units.

According to the descriptions of the implementations, a person skilled in the art may readily understand that the exemplary implementations described herein may be implemented by using software, or may be implemented by combining software and hardware. Therefore, the technical solution according to the embodiments of the present disclosure may be embodied in the form of a software product. The software product may be stored in a non-volatile storage medium (which may be a CD-ROM, a USB flash drive, a removable hard disk, and the like) or on a network, including several instructions to enable a computing device (which may be a personal computer, a server, a terminal device, a network device, or the like) to perform the method according to the embodiment of the present disclosure.

After considering the present disclosure and practicing the embodiment disclosed, a person skilled in the art may easily conceive of other implementations of the present disclosure. The present disclosure is intended to cover any variations, uses, or adaptive changes of the present disclosure. These variations, uses, or adaptive changes follow the general principles of the present disclosure and include common general knowledge or common technical means in the art, which are not disclosed in the present disclosure.

The present disclosure is not limited to the precise structures described above and shown in the accompanying drawings, and various modifications and changes can be made without departing from the scope of the present disclosure. The scope of the present disclosure is subject only to the appended claims.

What is claimed is:

1. A metrics collecting method, performed by an access network device, comprising:
   obtaining metrics configuration information, the metrics configuration information including information of a metrics reporting time segment;
   generating metrics reporting configuration information of a media streaming service;
   transmitting the metrics reporting configuration information to a user equipment;
   receiving a metrics reporting configuration response message from the user equipment;
   stopping, in response to determining the metrics reporting configuration response message indicates rejection of the metrics reporting configuration information, collection of metrics information of the media streaming service in the user equipment; and
   collecting, in response to determining the metrics reporting configuration response message indicates acceptance of the metrics reporting configuration information, the metrics information of the media streaming service of the user equipment in the metrics reporting time segment.

2. The metrics collecting method according to claim 1, wherein obtaining the metrics configuration information comprises:
   receiving the metrics configuration information transmitted by an operation administration and maintenance function entity;
   receiving the metrics configuration information transmitted by a network exposure function entity; or
   obtaining pre-configured metrics configuration information as the metrics configuration information.

3. The metrics collecting method according to claim 1, wherein the metrics reporting configuration information includes a start time point of the metrics reporting time segment, the start time point being used to instruct the user equipment to perform the metrics reporting of the media streaming service at the start time point.

4. The metrics collecting method according claim 1, further comprising:
   transmitting, in response to determining the metrics reporting time segment determined to end according to information of the metrics reporting time segment, information of stopping the metrics reporting to the user equipment.

5. The metrics collecting method according to claim 4, wherein the information of stopping the metrics reporting includes an end time point of the metrics reporting time segment, the end time point being used to instruct the user equipment to stop the metrics reporting of the media streaming service at the end time point.

6. The metrics collecting method according to claim 1, wherein the metrics reporting configuration information includes the information of the metrics reporting time segment, the information of the metrics reporting time segment being used to instruct the user equipment to perform the metrics reporting of the media streaming service at a start time point of the metrics reporting time segment and stop the metrics reporting of the media streaming service at an end time point of the metrics reporting time segment.

7. The metrics collecting method according to claim 1, wherein transmitting the metrics reporting configuration information to the user equipment further comprises:
   transmitting the metrics reporting configuration information to a first type of user equipment in a connected state.

8. The metrics collecting method according to claim 1, wherein transmitting the metrics reporting configuration information to the user equipment comprises:
   transmitting a paging message to a second type of user equipment in an inactive state, and transmitting the metrics reporting configuration information to the second type of user equipment after receiving a service request from the second type of user equipment, wherein the second type of user equipment transmits the service request and switches to a connected state in response to the paging message; or
   detecting whether the state of the second type of user equipment in an idle state or the inactive state changes to the connected state, and in response to determining that the state of the second type of user equipment changes to the connected state, transmitting the metrics reporting configuration information to the second type of user equipment.

9. A metrics collecting apparatus, comprising: at least one memory storing computer program instructions; and at least one processor coupled to the at least one memory and configured to execute the computer program instructions and perform:

obtaining metrics configuration information, the metrics configuration information including information of a metrics reporting time segment;
generating metrics reporting configuration information of a media streaming service;
transmitting the metrics reporting configuration information to a user equipment;
receiving a metrics reporting configuration response message from the user equipment;
stopping, in response to determining the metrics reporting configuration response message indicates rejection of the metrics reporting configuration information, collection of metrics information of the media streaming service in the user equipment; and
collecting, in response to determining the metrics reporting configuration response message indicates acceptance of the metrics reporting configuration information, the metrics information of the media streaming service of the user equipment in the metrics reporting time segment.

10. The metrics collecting apparatus of claim 9, wherein obtaining the metrics configuration information includes:
receiving the metrics configuration information transmitted by an operation administration and maintenance function entity;
receiving the metrics configuration information transmitted by a network exposure function entity; or
obtaining pre-configured metrics configuration information as the metrics configuration information.

11. The metrics collecting apparatus of claim 9, wherein the metrics reporting configuration information includes a start time point of the metrics reporting time segment, the start time point being used to instruct the user equipment to perform the metrics reporting of the media streaming service at the start time point.

12. The metrics collecting apparatus of claim 9, wherein the at least one processor is further configured to execute the computer program instructions and perform:
transmitting, in response to determining the metrics reporting time segment determined to end according to information of the metrics reporting time segment, information of stopping the metrics reporting to the user equipment.

13. The metrics collecting apparatus of claim 12, wherein the information of stopping the metrics reporting includes an end time point of the metrics reporting time segment, the end time point being used to instruct the user equipment to stop the metrics reporting of the media streaming service at the end time point.

14. The metrics collecting apparatus of claim 9, wherein the metrics reporting configuration information includes the information of the metrics reporting time segment, the information of the metrics reporting time segment being used to instruct the user equipment to perform the metrics reporting of the media streaming service at a start time point of the metrics reporting time segment and stop the metrics reporting of the media streaming service at an end time point of the metrics reporting time segment.

15. The metrics collecting apparatus of claim 9, wherein transmitting the metrics reporting configuration information to the user equipment further includes:
transmitting the metrics reporting configuration information to a first type of user equipment in a connected state.

16. The metrics collecting apparatus of claim 9, wherein transmitting the metrics reporting configuration information to the user equipment includes:
transmitting a paging message to a second type of user equipment in an inactive state, and transmitting the metrics reporting configuration information to the second type of user equipment after receiving a service request from the second type of user equipment, wherein the second type of user equipment transmits the service request and switches to a connected state in response to the paging message; or
detecting whether the state of the second type of user equipment in an idle state or the inactive state changes to the connected state, and in response to determining that the state of the second type of user equipment changes to the connected state, transmitting the metrics reporting configuration information to the second type of user equipment.

17. A non-transitory computer-readable storage medium storing computer program instructions executable by at least one processor to perform:
obtaining metrics configuration information, the metrics configuration information including information of a metrics reporting time segment;
generating metrics reporting configuration information of a media streaming service;
transmitting the metrics reporting configuration information to a user equipment;
receiving a metrics reporting configuration response message from the user equipment;
stopping, in response to determining the metrics reporting configuration response message indicates rejection of the metrics reporting configuration information, collection of metrics information of the media streaming service in the user equipment; and
collecting, in response to determining the metrics reporting configuration response message indicates acceptance of the metrics reporting configuration information, the metrics information of the media streaming service of the user equipment in the metrics reporting time segment.

18. The non-transitory computer-readable storage medium of claim 17, wherein obtaining the metrics configuration information includes:
receiving the metrics configuration information transmitted by an operation administration and maintenance function entity;
receiving the metrics configuration information transmitted by a network exposure function entity; or
obtaining pre-configured metrics configuration information as the metrics configuration information.

* * * * *